United States Patent
Zhang et al.

(10) Patent No.: US 10,643,759 B2
(45) Date of Patent: May 5, 2020

(54) GRATING AND RADIATION IMAGING DEVICE

(71) Applicants: Tsinghua University, Beijing (CN); Nuctech Company Limited, Beijing (CN)

(72) Inventors: Li Zhang, Beijing (CN); Mingzhi Hong, Beijing (CN); Qingping Huang, Beijing (CN); Le Shen, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 160 days.

(21) Appl. No.: 15/802,473

(22) Filed: Nov. 3, 2017

(65) Prior Publication Data
US 2018/0075938 A1    Mar. 15, 2018

Related U.S. Application Data

(63) Continuation of application No. PCT/CN2016/093274, filed on Aug. 4, 2016.

(30) Foreign Application Priority Data

Sep. 8, 2015    (CN) .......................... 2015 1 0568450

(51) Int. Cl.
*G21K 1/00*    (2006.01)
*G21K 1/06*    (2006.01)
(Continued)

(52) U.S. Cl.
CPC .............. *G21K 1/06* (2013.01); *G02B 5/1838* (2013.01); *G21K 1/025* (2013.01); *G21K 2201/067* (2013.01); *G21K 2207/005* (2013.01)

(58) Field of Classification Search
CPC ........ G21K 1/025; A61B 6/4291; F02F 1/167
(Continued)

(56) References Cited

U.S. PATENT DOCUMENTS 4,414,679 A * 11/1983 Liebert ................... G02F 1/167
378/154
5,222,114 A   6/1993 Kamata et al.
(Continued)

FOREIGN PATENT DOCUMENTS

CN    201965938 U    9/2011
CN    102525541 A    7/2012
(Continued)

OTHER PUBLICATIONS

"European Application No. 168435402. Extended European Search Report dated Apr. 3, 2019", (Apr. 3, 2019), 9 pgs.

*Primary Examiner* — Audrey Y Chang
(74) *Attorney, Agent, or Firm* — Schwegman Lundberg & Woessner, P.A.

(57) ABSTRACT

The disclosure relates to a grating and a radiation imaging device. The grating comprises a plurality of stacked grating elements. The grating elements are stacked to form a grid. The grating element comprises a first sheet and a second sheet having two parallel planes. The second sheet is stacked at the first sheet in a length direction of the first sheet. The first sheet is almost impervious to radiation. The present disclosure stacks the sheets having different specifications together to form the grating with uniform grating slits, such that there is no limitation on the thickness of the grating and the grating can be used along with high-energy radiations.

11 Claims, 6 Drawing Sheets

(51) Int. Cl.
*G21K 1/02* (2006.01)
*G02B 5/18* (2006.01)

(58) Field of Classification Search
USPC ............ 378/62, 35, 98, 154, 155; 250/515.1
See application file for complete search history.

(56) References Cited

U.S. PATENT DOCUMENTS

| | | |
|---|---|---|
| 6,980,629 B1 | 12/2005 | Hoheisel |
| 2003/0035512 A1 | 2/2003 | Kohda |
| 2003/0076929 A1* | 4/2003 | Hoheisel ................ G21K 1/025 378/98.8 |
| 2010/0006781 A1* | 1/2010 | Tonami ................. G21K 1/025 250/515.1 |
| 2011/0164727 A1* | 7/2011 | Tonami ................ A61B 6/4291 378/62 |
| 2012/0307976 A1 | 12/2012 | Kaneko |

FOREIGN PATENT DOCUMENTS

| | | |
|---|---|---|
| CN | 102930917 A | 2/2013 |
| CN | 103901516 A | 7/2014 |
| CN | 203787096 U | 8/2014 |
| CN | 104575657 A | 4/2015 |
| CN | 105139913 A | 12/2015 |
| CN | 204926815 U | 12/2015 |
| DE | 102009019647 A1 | 11/2010 |
| EP | 2511912 A2 | 10/2012 |
| JP | 53-138294 A | 12/1978 |
| JP | 2012-093117 A | 5/2012 |

\* cited by examiner

GRATING AND RADIATION IMAGING DEVICE

CROSS REFERENCE TO RELATED APPLICATIONS

This application is a continuation of PCT/CN2016/093274 filed Aug. 4, 2016, which claims priority to CN 201510568450.5 on Sep. 8, 2015, both of which are incorporated herein by reference.

FIELD

The present disclosure relates to a grating and a radiation imaging device, and belongs to the technical field of radiation imaging.

BACKGROUND

A grating is a component for measuring based on distance between lines on the grating. The grating may be classified into geometrical grating (amplitude grating) and diffraction grating (phase grating) according to different principles of forming moire fringes. The geometrical grating is adopted in micro-scale and submicron-scale grating measurement, in which a grating pitch of 100 to 20 μm is much greater than light wavelengths of light sources and diffraction phenomenon can be negligible. When two gratings move with respect to each other, low frequency beat phenomenon is generated and thus moire fringes are formed. This measurement principle is referred to as an image principle. The diffraction grating is adopted in nano-scale grating measurement, in which a grating pitch is 8 or 4 μm, a width of line is very close to wavelength of light, and diffraction and interference phenomena are generated and thus moire fringes are formed. This measurement principle is referred to as an interference principle.

The grating includes a light transmission portion (hereinafter referred to as "slit width") and a light shielding portion (hereinafter referred to as "grid"), and thereby light incident on the grating is divided into several light beams. This allows the diffraction grating to be irradiated by the light beams having spatial coherence. The diffraction grating diffracts light from a source grating, and forms an interference pattern according to the Talbot effect. A light detector detects the light from the diffraction grating. In a grating-based X-ray phase contrast imaging system, an X-ray absorbing grating shall be arranged behind an X-ray source. A portion (grid) of the X-ray absorbing grating in which a heavy metal is filled absorbs X rays, and X rays transmit through the other portion (grating slit) of the grating, such that the absorbing grating and the common grating X-ray source conjointly form an X-ray source having one-dimensional spatial coherence.

As known, as the radiation imaging technology continuously develops, a higher imaging precision is required and thereby components in imaging devices shall have more precise dimensions. For example, there is a high requirement on gratings in radiation imaging devices. Existing methods for manufacturing gratings mainly include mechanical ruling, laser holographic lithography and electron beam lithography. The mechanical ruling has very strict requirements and following disadvantages: long processing time, low precision, high production difficulty, and hard to rule sub-micron lines. The electron beam lithography is able to form nano-scale high resolution pattern, but has a very low efficiency and cannot form patterns with high aspect ratios. The laser holographic lithography is able to form gratings in deep sub-micron levels, but has a high control precision, high cost and low productivity.

SUMMARY

The present disclosure can solve the following problem that existing X-ray grating formed with chemical corrosion has a low forming efficiency and high cost, and thus cannot be used along with high-energy X-rays.

The present disclosure provides a grating and a radiation imaging device.

In one aspect, the present disclosure provides a grating, including: a plurality of stacked grating elements, wherein the grating elements are stacked to form a grid; the grating element comprises a first sheet and a second sheet having two parallel planes; the second sheet is stacked at the first sheet in a length direction of the first sheet; and the first sheet is almost impervious to radiation.

The second sheet has a length smaller than that of the first sheet, and there are at least two second sheets; and the second sheets are stacked at two ends on an identical surface of the first sheet in the length direction of the first sheet, such that a grating slit is formed between adjacent first sheets.

The grating slit is filled with a material previous to radiation.

The first sheet has a thickness different from that of the second sheet.

Each of the first sheet and the second sheet has a thickness of 0.001 to 3 millimeters.

The grating element further comprises a third sheet, wherein the third sheet has a length smaller than that of the first sheet, at least three second sheets are stacked at the two ends and a middle position of an identical surface of the first sheet in the length direction of the first sheet, and the third sheet is stacked on the first sheet between two of the second sheets.

The third sheet has a thickness smaller than that of the second sheet.

The second sheet has a length same with that of the first sheet; and the second sheet is previous to radiation.

The first sheet has a thickness different from that of the second sheet.

Each of the first sheet and the second sheet has a thickness of 0.001 to 3 millimeters.

The first sheet is a high-density sheet.

The first sheet is a tungsten alloy sheet.

The grating elements are bonded with adhesives or compressed with tools to be assembled into the grating.

In another aspect, the present disclosure provides a radiation imaging device, characterized by the above-mentioned grating.

The grating and the radiation imaging device according to the present disclosure stack the sheets having different specifications together to form the grating with uniform grating slits, such that there is no limitation on the thickness of the grating and the grating can be used along with high-energy radiations.

DETAILED DESCRIPTION

Exemplary embodiments will be described in detail with reference to the drawings. However, the present disclosure should not be taken to limit the invention to the specific embodiments shown, but are for explanation and understanding only.

Figure 1:
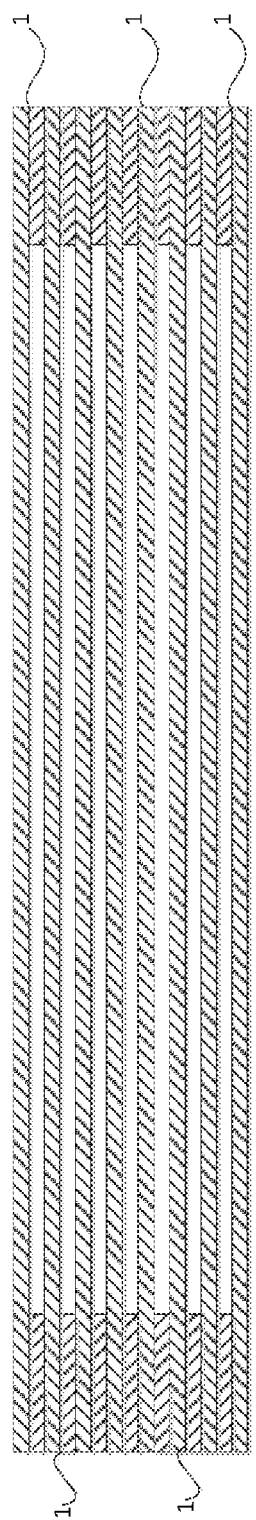
FIG. 1 is a schematic diagram of a grating manufactured according to a first example of the present disclosure.
Figure 2:
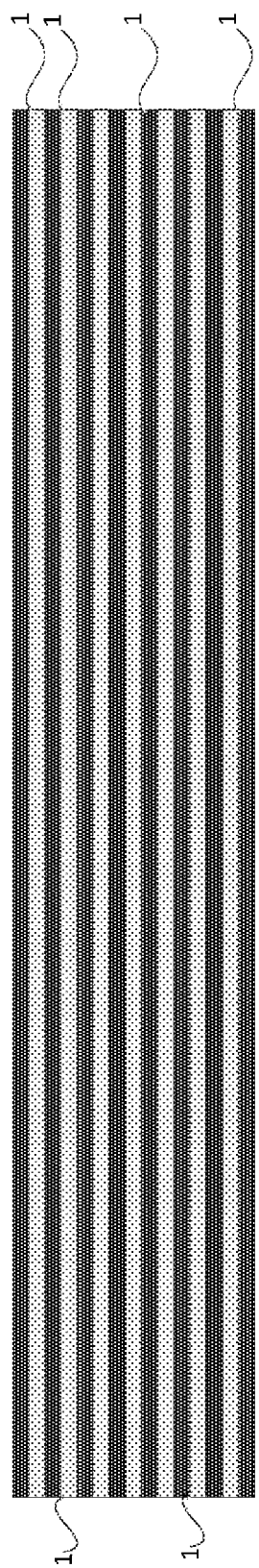
FIG. 2 is a schematic diagram of a grating manufactured according to a fourth example of the present disclosure.

As shown in FIG. 1, the present disclosure provides a grating, including a plurality of stacked grating elements 1, wherein the grating elements 1 are stacked to form a grid. The grating element 1 includes a first sheet 11, 21 and a second sheet 12, 22 having two parallel planes. The second sheet 12, 22 is stacked at the first sheet 11, 21 in a length direction of the first sheet 11, 21. The first sheet 11, 21 is almost impervious to radiation. The grating according to the present disclosure will be described in detail below.

EXAMPLE 1

Figure 3:
FIG. 3 schematically shows a side view of a grating element according to the first example of the present disclosure.
Figure 4:
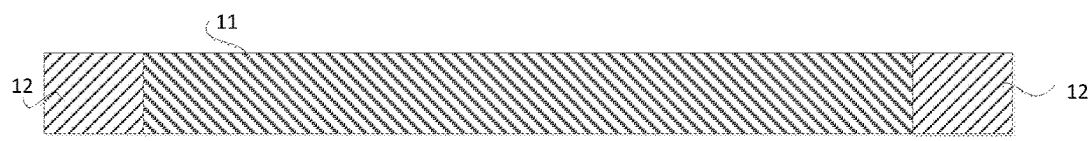
FIG. 4 schematically shows a front view of the grating element according to the first example of the present disclosure.

As shown in FIG. 3 and FIG. 4, the grating element 1 includes a first sheet 11 and second sheets 12. The second sheet 12 has a length smaller than that of the first sheet 11, and at least two second sheets 12 are stacked at two ends on an identical surface of the first sheet 11 in a length direction of the first sheet 11, such that a grating slit is formed between adjacent first sheets 11.

As shown in FIGS. 1, 3 and 4, according to an embodiment of the present disclosure, the grating element 1 is formed of sheets having two different lengths, wherein the first sheet 11 and the second sheet 12 have different lengths. The two second sheets 12 are stacked at two ends on the identical surface of the first sheet 11. In this example, the first sheet 11 has a thickness same with or different from that of the second sheets 12. The thickness of the first sheet 11 determines a width of grating line, and the thickness of the second sheet 12 determines a width of grating slit. FIG. 1 shows a grating formed from grating elements 1 composed of first sheets 11 and second sheets 12 having the same thickness according to the present disclosure, wherein the grating lines and the grating slits have same widths. Gratings with different duty ratios can be manufactured by adjusting the thicknesses of the first sheets 11 and the second sheets 12. The thicknesses of the first sheets and the second sheets can be ranged from 0.001 to 3 millimeters.

Figure 5:
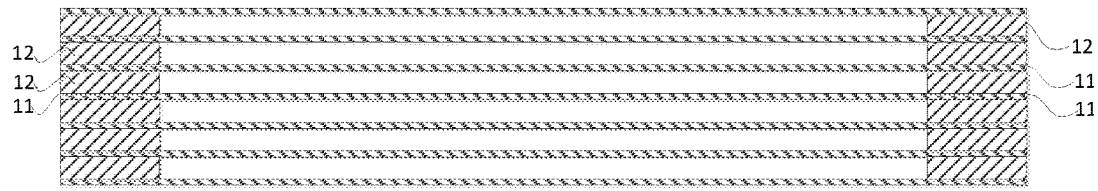
FIG. 5 and FIG. 6 schematically show side views of grating elements manufactured with sheets having different thicknesses according to the first example of the present disclosure.

As shown in FIG. 5, the first sheet 11 has a thickness smaller than that of the second sheets 12 in this example. In the grating formed from the grating elements 1 in this example, the grating line has a width smaller than that of the grating slit. According to the present disclosure, the grating slit is formed between adjacent first sheets 11. In order to prevent deformation of the first sheets when the grating is formed from multiple grating elements 1, the grating slits are filled with a thin material, which is previous to radiation.

Figure 6:
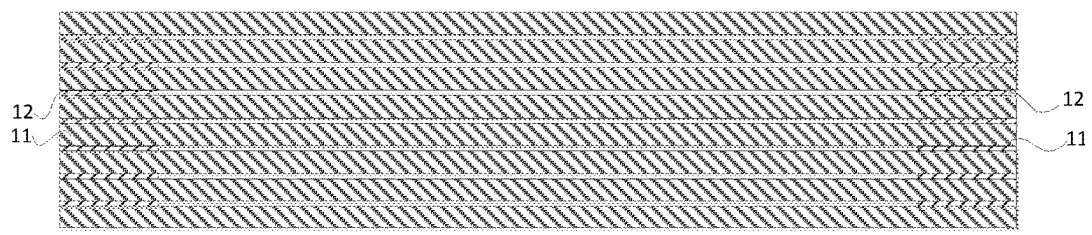

As shown in FIG. 6, the first sheet 11 has a thickness larger than that of the second sheet 12 in this example. In the grating formed from the grating elements 1 in this example, the grating line has a width larger than that of the grating slit.

EXAMPLE 2

Figure 7:
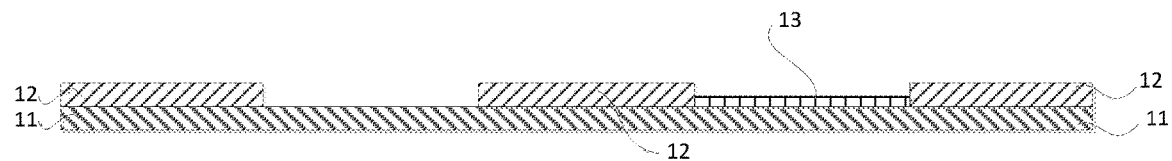
FIG. 7 is a schematic diagram of a grating manufactured according to a second example of the present disclosure.
Figure 8:
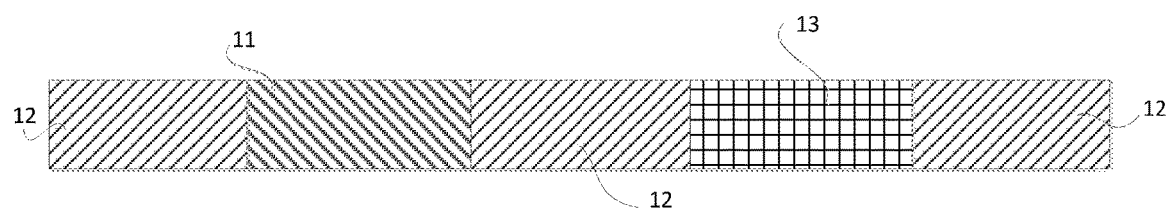
FIG. 8 schematically shows a side view of a grating element according to the second example of the present disclosure.
Figure 9:
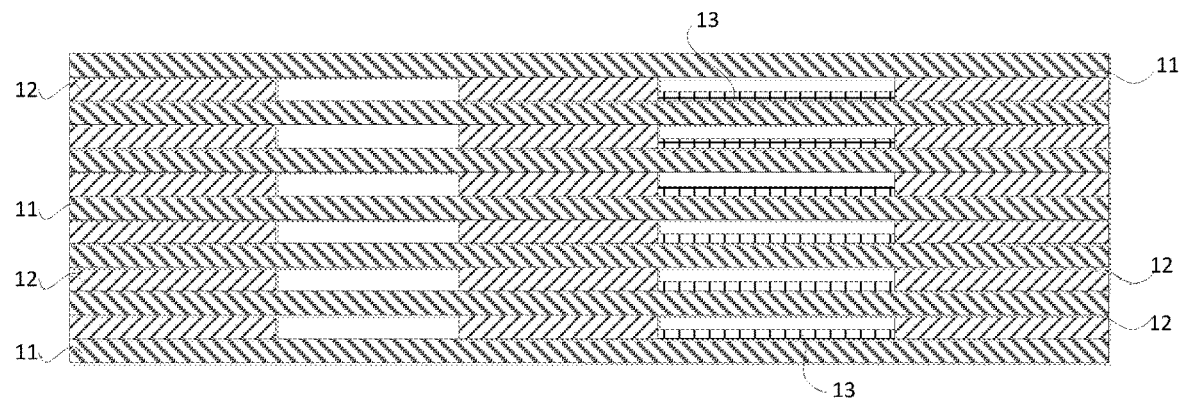
FIG. 9 schematically shows a front view of grating elements according to the second example of the present disclosure.

As shown in FIGS. 7 to 9, this example is substantially same as example 1, but differs in that in this example, the grating element 1 is formed from sheets having three different lengths. The first sheet 11 and the second sheet 12 have different lengths. The grating element further includes a third sheet 13, which has a length smaller than that of the first sheet 11. At least three second sheets 12 are stacked at two ends and a middle position on an identical surface of the first sheet 11 in a length direction of the first sheet 11. The third sheet 13 is stacked at the first sheet 11 between two of the second sheets 12. The length of the third sheet 13 may be determined according to a length of a gap formed by the first sheet 11 and the second sheets 12. The length of the third sheet 13 may be the same with the length of the gap formed by the first sheet 11 and the second sheets 12. If the gap formed by the first sheet 11 and the second sheets 12 has a length same with that of the second sheet 12, the length of the third sheet 13 may be as also same with that of the second sheet 12. As shown in FIG. 9, in order to form a grating structure having another duty ratio in a same grating, the thickness of the third sheet 13 should be adjusted accordingly. When the third sheet 13 is stacked at the first sheet 11 between two of the second sheets 12, the thickness of the third sheet 13 is smaller than that of the second sheet 12.

EXAMPLE 3

Figure 10:
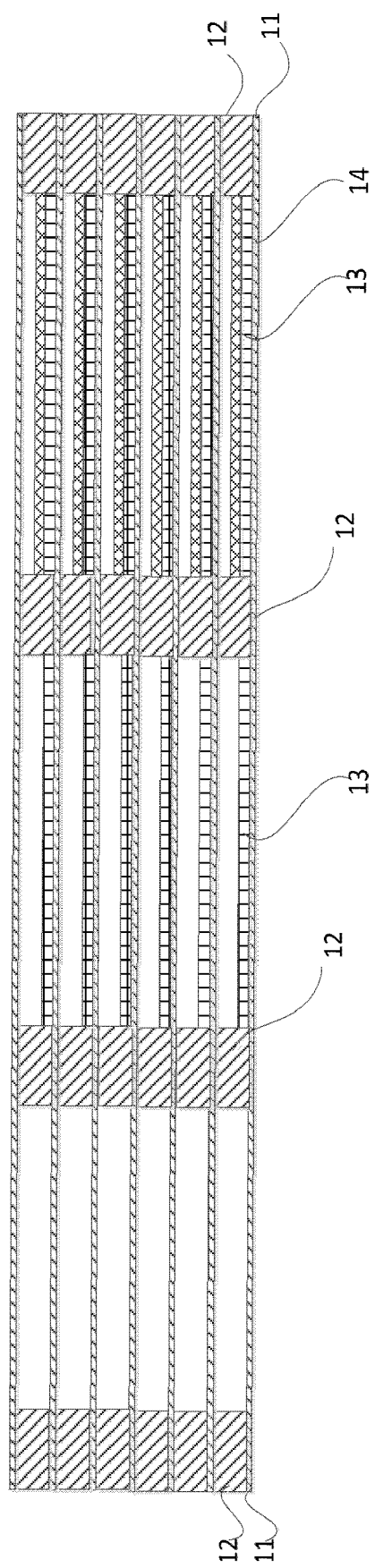
FIG. 10 is a schematic diagram of a grating manufactured according to a third example of the present disclosure.

It should be understood that the present disclosure is not limited to the above. According to the present disclosure, gratings having different duty ratios can also be further formed by combining more different sheets. As shown in FIG. 10, this example is substantially same as example 1, but differs in that in this example, the grating element 1 is formed of four kinds of different sheets, wherein a fourth sheet 14 is further provided. At least four second sheets 12 are stacked on an identical surface of the first sheet 11 in a length direction of the first sheet 11. The third sheet 13 is stacked at the first sheet 11 between two of the second sheets 12. The fourth sheet 14 is further stacked at the third sheet 13. One first sheet 11, four second sheets 12, two third sheets 13 and one fourth sheet 14 conjointly form the grating element 1, and several stacked grating elements 1 form a grating having various duty ratios. It should be understood that according to the above examples of stacking different sheets to form the grating, other gratings having various duty ratios can be further formed.

In the present disclosure, the first sheet 11 and the second sheet 12 of the grating element 1 are sheets almost impervious to radiation, e.g., sheets made of a high-density material, such as tungsten alloy sheets. As each sheet of the grating element 1 according to the present disclosure has a certain width, and the grating formed from the grating elements 1 has a thickness consistent with the widths of the sheets, and the grating according to the present disclosure can be used along with high-energy X-rays. Existing grating manufactured with chemical methods have small thickness, and thus cannot be applied with high-energy X-rays. In the present disclosure, sheets are stacked to form uniform slits and there is no limitation on width of sheet and thus thickness of grating. Accordingly, the grating can be used for high-energy radiations, and the independently formed sheets have good toughness and strength. The grating elements according to the present disclosure can be bonded with adhesives or compressed with tools to be assembled into a grating.

EXAMPLE 4

Figure 11:
FIG. 11 schematically shows a side view of a grating element according to the fourth example of the present disclosure.
Figure 12:
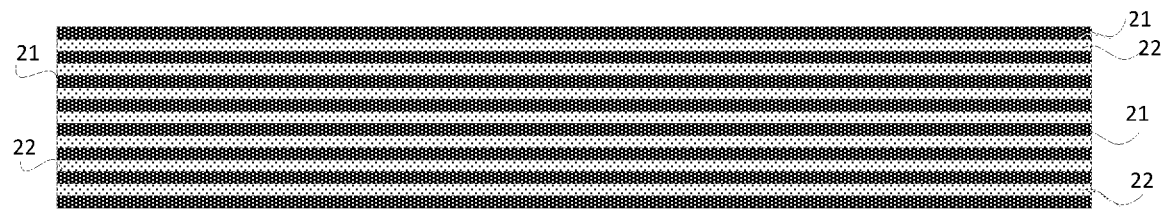
FIG. 12 is a structural schematic diagram of a grating manufactured according to the fourth example of the present disclosure.

As shown in FIGS. 11 and 12, this example is substantially same as example 1, but differs in that the second sheet 22 has a same length with the first sheet 21, the first sheet 21 is almost impervious to radiation, and the second sheet 22 is previous to radiation. It should be noted here that the thicknesses of the first sheet 21 and the second sheet 22 in this example may be changed from the described solution according to actual needs, and the first sheet 21 may have a thickness same with or different from that of the second sheet 22. The first sheets 21 and the second sheets having different thicknesses may form a grating having different grating slits. Moreover, other implementations can be obtained by combining example 4 with examples 1-3. For the sake of briefness, the other implementations are not redundantly described herein.

In conclusion, the grating and the radiation imaging device according to the present disclosure stack the sheets having different specifications together to form the grating with uniform grating slits, such that there is no limitation on the thickness of the grating and the grating can be used along with high-energy radiations.

It should be noted that the above embodiments are merely provided for describing the technical solutions of the present invention, but not intended to limit the present invention. It should be understood by those of ordinary skill in the art that various alternations and modifications may be made without departing from the spirit and scope of the technical solutions of the embodiments of the present invention. Such equivalent embodiments are intended to be within the scope of the invention. The scope of the invention is defined by the accompanying claims.

What is claimed is:

1. A grating, comprising:
   a plurality of stacked grating elements, wherein the grating elements are stacked to form a grid;
   the grating element comprises a first sheet and a second sheet having two parallel planes;
   the second sheet is stacked at the first sheet in a length direction of the first sheet;
   the second sheet has a length smaller than that of the first sheet, and there are at least two second sheets; and
   the second sheets are stacked at two ends on an identified surface of the first sheet in the length direction of the first sheet, such that a uniform grating slit is formed between adjacent first sheets, and the thickness of the second sheet determines a width of the grating slit.

2. The grating according to claim 1, wherein the grating slit is filled with a material pervious to X-ray radiation.

3. The grating according to claim 1, wherein the first sheet has a thickness different from that of the second sheet.

4. The grating according to claim 1, wherein each of the first sheet and the second sheet has a thickness of about 0.001 to 3 millimeters.

5. The grating according to claim 1, wherein the grating element further comprises a third sheet;
   the third sheet has a length smaller than that of the first sheet, and at least three second sheets are stacked at the two ends and a middle position of an identical surface of the first sheet in the length direction of the first sheet; and
   the third sheet is stacked on the first sheet between two of the second sheets.

6. The grating according to claim 5, wherein the third sheet has a thickness smaller than that of the second sheet.

7. The grating according to claim 1, wherein the first sheet is a tungsten alloy sheet.

8. The grating according to claim 7, wherein the grating elements are bonded with adhesives or compressed with tools to be assembled into the grating.

9. The grating according to claim 1, wherein the first sheet is impervious to X-ray radiation.

10. A radiation imaging device, comprising a grating comprising a plurality of stacked grating elements, wherein the grating elements are stacked to form a grid;
    the grating element comprises a first sheet and a second sheet having two parallel planes;
    the second sheet is stacked at the first sheet in a length direction of the first sheet; and
    the second sheet has a length smaller than that of the first sheet, and there are at least two second sheets; and
    the second sheets are stacked at two ends on an identified surface of the first sheet in the length direction of the first sheet, such that a uniform grating slit is formed between adjacent first sheets, and the thickness of the second sheet determines a width of the grating slit.

11. The radiation imaging device according to claim 10, wherein the first sheet is impervious to X-ray radiation.

* * * * *